3,121,029
ELECTRODES AND METHOD OF MAKING
THE SAME
Joseph C. Duddy, Trevose, Pa., assignor to The Electric Storage Battery Company, a corporation of New Jersey
Filed Oct. 13, 1961, Ser. No. 147,702
41 Claims. (Cl. 136—19)

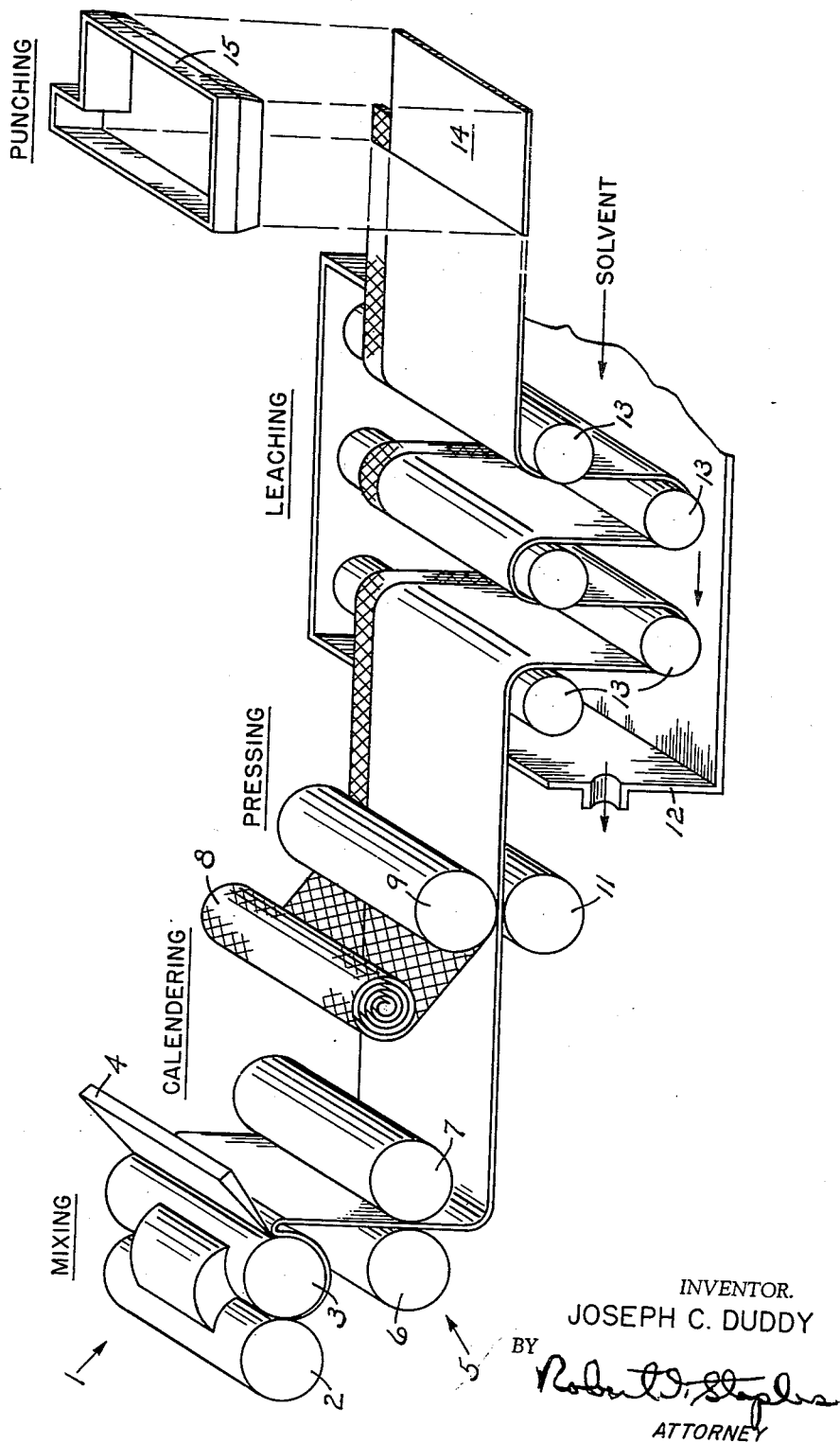

The present invention relates to electrodes and to methods for producing them. More specifically, the present invention is concerned with a new and improved method of manufacturing battery electrodes utilizing a unique binding means for electrode active materials which produces novel electrodes characterized by high capacity, the ability to be discharged at high rates, and an extremely high efficiency in terms of energy available in proportion to electrode weight and volume.

This application is a continuation-in-part of applications Serial Nos. 818,638 and 818,766, filed June 8, 1959, now abandoned.

An object of the present invention is to provide new and improved battery electrodes which can be distinguished from prior art electrodes by reason of a new kind of porosity of an extremely high order. In accordance with the present invention, the electrochemically active material of an electrode is bound in a matrix of thermoplastic material, such as polyethylene, which is substantially inert in the corrosive environment within a battery. As a result of the novel manufacturing methods of the present invention, the matrix of active material and thermoplastic binder is provided with a multiplicity of thread-like pores having average diameters no larger than one micron in size. By reason of this unique microporosity, electrodes in accordance with the present invention are characterized by having higher electrochemical efficiencies in terms of use of the active material than has heretofore been achieved in resin bound electrodes.

Another object of the present invention is to provide new and improved methods of producing electrodes utilizing a novel combination of binders adapted to furnish the electrodes with the mechanical strength necessary for efficient handleability during manufacture and to provide in the finished electrodes, the porosity necessary for efficient utilization of the active material.

Still another object of the present invention is to utilize two substantially incompatible thermoplastic resins, that is, resins which will exist as separate and distinct phases after mixing, one of the resins being soluble in a given solvent and the other resin being insoluble in that solvent, to provide highly porous structurized electrodes having extremely large effective surface areas.

A further object of the present invention is to provide a method of electrode manufacture which may be carried out as a continuous operation from the first step of electrode manufacture up to and including the formation of finished electrodes. It should be understood, however, that while particularly adapted to be continuous, the process of the present invention may be carried out in intermittent steps and that, in whichever way it is practiced, it will provide rapid, economical electrode production.

Though not limited thereto, the present invention is particularly adapted for production of electrodes of the type in which the electrochemically active material is not soluble in the electrolyte or where the electrochemical conversion of the active material, a prerequisite to a subsequent electrical yield, is an expansion process rather than a shrinkage process. Where the electrode active material is soluble in the electrolyte or where the electrochemical conversion of the active material is a shrinkage process, porosity may be obtained by the judicious electrochemical formation of the electrode. For example, silver oxide or lead oxide can be incorporated in a permanent resin binder and the electrochemical conversion of silver oxide to silver or lead oxide to lead during electrode discharge will develop plate porosity since this electrochemical conversion is a shrinkage process. With metallic silver as the starting material, however, the electrochemical action cannot be employed to provide porosity because the conversion of silver to silver oxide is the reverse of the above or an expansion process which destroys rather than induces porosity. In order for silver to convert electrochemically to silver oxide or silver peroxide, it must be in contact with a suitable electrolyte, a condition which presupposes internal plate porosity. In addition, since this conversion is expensive, there must be space or interstitial porosity within the electrode to accommodate the growth unless the matrix can expand for this purpose. While this expansion process has been described in connection with positive electrodes during charging, it should be understood that a similar expansion process occurs in negative electrodes during discharge. Accordingly, it is also an object of the present invention to provide a new and improved means for obtaining the porosity required in battery electrodes to accommodate the expansion of electrode active material and for efficient utilization of the active material.

As discussed hereinbefore, the absence of initial plate porosity is not a serious limitation with certain active materials since interstitial pores are readily developed as a result of the solubility of the active material in electrolyte and since their electrochemical conversion upon electrochemical formation or initial charge is a shrinkage process. For example, the conversion of zinc oxide to zinc is a shrinkage process and zinc oxide is soluble in alkaline electrolytes. Accordingly, by controlling the conditions attending the formation of zinc electrodes, it is possible, to a limited degree, to control the final plate porosity. However, it can be seen that maximum electrode porosity accrues only because of the loss of electrode material. In addition, since it is often desirable to saturate the electrolyte with zinc, the amount of plate porosity that can be achieved as a result of the solubility of zinc oxide in electrolyte is limited. Accordingly, if electrode porosity is controlled by means other than the loss of material by solution, electrode performance can be improved. Still further, if the ratio of electrode active material to inactive binder present in the electrode can be increased without sacrificing the strength necessary for electrode handleability, the high rate efficiency characteristics of such an electrode can be improved. It is, therefore, an object of the present invention to provide means for accomplishing this.

The present invention is also adapted for the production of the electrodes of the type in which the electrochemically active material is not suitable for sintering or other conventional forms of structurization and which thus, requires the presence of a binder to provide a matrix for the active material. Since binders are generally inert and thus, contribute nothing to the electrochemical reaction of a battery, it is desirable that battery electrodes utilize as little binding material in proportion to active material as is possible commensurate with providing reasonable mechanical strength in the final product. Accordingly, it is a further object of the present invention to provide a method of manufacturing battery electrodes which minimizes the amount of binder which need be present in the finished electrode.

In my co-pending application, Serial No. 744,544, filed June 25, 1958, I disclosed a method of producing battery electrodes in which a soluble thermoplastic resin is utilized as a temporary binding matrix for the active materials of battery electrodes. More particularly, I disclosed in that application a method of making battery electrodes which comprises intimately and thoroughly mixing with an electrochemically reducible metallic compound, a plasticized resin substantially insoluble in an electrolyte of a selected concentration and soluble in a solution, such as water, in which the metal of said metallic compound is to a major degree insoluble, forming an electrode from said mixture, electrochemically reducing said metallic compound to metal and then subjecting said electrode to a solvent to substantially remove the resin to yield a porous structurized electrode. As disclosed, the resin utilized is a water soluble hydrocarbon, as for example, one of the polyethylene ether structures such as a high molecular weight polymer of ethylene oxide or a polyethylene glycol. The electrodes produced in accordance with this aforesaid application contain substantially no binder.

The present invention is characterized by the use of a first thermoplastic resin binder, which is soluble in a given solvent, in admixture with a second incompatible thermoplastic resin binder, which is insoluble in the given solvent, to produce battery electrodes in which the soluble binder is removed from the electrode at the completion of electrode manufacture to provide a porous electrode having structurization due, in most part, to the presence of the insoluble thermoplastic binder in the finished electrode. In accordance with the present invention, a soluble thermoplastic resin and an incompatible insoluble thermoplastic resin are worked under heat and pressure to produce a plasticized mass. After the plasticization and admixing of the thermoplastic resins has been completed, there is added to the plasticized mass, electrode active material in powdered form for the particular type of electrode being manufactured. After a time interval adequate for the thorough and intimate mixing of the powdered active material and the thermoplastic resins, the mixture is calendered into sheets or extruded into the desired shape for battery electrodes. The calendered sheet material, either before or after being cut into the desired shape for an electrode, may be pressed into a suitable grid. From the assembly produced by the pressing operation, battery electrodes may be cut to any size or shape. After the cutting operation, the soluble thermoplastic resin may be leached from the electrodes by means of soaking them in a suitable solvent, leaving the active material locked or bound in a porous matrix of the insoluble thermoplastic material. In this manner, the soluble resin, by virtue of its thermoplasticity and resinous nature, provides the extra strength needed for electrode handleability during manufacture and upon its removal at the completion of manufacture, by virtue of its solubility, the porosity required for efficient utilization of the active material. Also in accordance with the present invention, finely divided graphite or other conductive medium is added to the electrode formulation to increase the conductivity of the electrodes. The graphite may be added as a separate ingredient with the powdered active material to the plasticized resin and be intimately mixed therewith on the mill. Preferably, however, the finely powdered graphite is first intimately mixed, as by ball milling, with the active material to form on the individual active material particles a porous coating of graphite. In this manner, there is produced electrodes of extremely high efficiency.

In carrying out the present invention, the combination of resins utilized must be chosen with the following criteria in mind. First, both resins must be thermoplastic and have substantially similar physical properties in the plastic state. In this respect, it is desirable that the resins have similar viscosities in the plastic state and that they become plastic within temperature ranges which overlap to an extent permitting the mixing of the resins in their plastic states without substantially degrading the resin with the lower temperature of plasticization. Secondly, the two resins must be substantially incompatible, that is, that after admixture in their plasticized states, they exist as separate and distinct phases in the product, the one being substantially insoluble in the other. Thirdly, one resin must be readily soluble in a solvent in which the other resin is substantially insoluble. Lastly, the resins must be capable of a high degree of loading with finely divided active material.

By way of specific example, the following are some of the resins which may be utilized as permanent binder material: polyethylene, polypropylene, polystyrene, and polyvinyl chloride. The following water soluble thermoplastic resins are extremely advantageous from the economic point of view for use as the temporary soluble thermoplastic binder: polyethylene oxide, polyethylene glycol, and polyvinyl pyrrolidone. It should be understood, however, that it is not necessary that the soluble thermoplastic resin utilized as the temporary binder and pore forming agent be water soluble. Care should be taken, however, in choosing the solvent which is to be utilized for removing the temporary resin phase since it should not be one which will react adversely with the active material of the electrode or the electrode grid structure if any is employed. In this respect, water soluble resins are also desirable because when water is used as the solvent, no adverse reaction has been found to occur.

The use of a soluble thermoplastic resin as a pore forming agent can be readily contrasted with the use of prior art pore forming agents such as starch, salt, horsehair, and the like which contribute nothing to the strength of the electrode during manufacture and, by their presence, limit the loading of the permanent binder with electrochemically active ingredients and thus, require the presence of a higher percentage of binder in the finished electrode. The reason that these prior art pore forming agents limit the loading of the non-soluble binder with active material is due to the fact that such materials are generally of the same physical nature as the active material, that is, granular in nature, and do not themselves act as binders.

As a result of the incompatibility of the thermoplastic resins utilized in the present invention and the intimate milling and blending thereof, there is produced a thermoplastic material having thread-like pores of capillary size upon the removal of the soluble resin phase. The pores thus formed are uniformly distributed throughout the permanent binder, oriented with respect to the permanent binder and of a size much less than the particle size of the active material. As a result, substantially no active material is removed from the permanent binder when the soluble resin phase is removed by leaching. Measurements have shown that the pores developed by the removal of the soluble resin phase are generally less than one micron in size. As a consequence of the microporosity thus developed and the resiliency of the permanent binder utilized, the electrodes of the present invention swell when placed in the leaching solvent. This swelling can be attributed to the capillary expansion of the porous matrix, providing for more pore formation and extremely efficient utilization of the active material.

A better understanding of the present invention may be had from the following description of specific embodiments thereof when read with reference to the accompanying drawing which illustrates schematically the various steps to be performed in carrying out the present invention. It should be understood however, that while the explanation which follows is directed toward the production of cadmium electrodes, that the process illustrated in the drawing is applicable to the production of many different type electrodes, several of which will also be described in some detail.

*Example 1*

Referring now to the drawing, one part by weight of polyethylene in pellet form, which will be the permanent electrode binder, and three parts by weight of polyethylene oxide, which will serve as a temporary electrode binder and pore forming agent, are mixed under heat and pressure to produce a plasticized mass. My specific preference for polyethylene in pellet form is that available on the market under the trade name "Alathon 14," manufactured by the Du Pont Co. The preferred form of powdered polyethylene oxide is that available on the market under the trade name, "Polyox," type WSR-35, manufactured by the Union Carbide & Chemical Co.

As shown in the drawing, the intimate mixing of the two resins may be accomplished in an intensive mixer or on a mill 1 which is schematically shown as two rollers 2 and 3 which are operated at differential speeds for plasticizing the resins. The rollers 2 and 3 may be heated by any suitable means such as steam or electricity to a temperature of from about 220° F. to about 250° F. for plasticizing the resins. After the plasticization and admixture of the two thermoplastic resins have been completed, there is added to the plasticized mix on the mill, 28 parts by weight of an active material such as finely powdered cadmium oxide. After a time interval adequate for the thorough and intimate mixing of the cadmium oxide and the thermoplastic resins, a stripper blade 4 may be moved toward one of the rollers for the progressive withdrawal therefrom of a banded mass of the intimately mixed material. Those skilleld in the art will understand how to select the time required for plasticizing the thermoplastic resins and also the time required to produce the intimate mixing described above. For the particular resins described, a time order of from 2 to 3 minutes is satisfactory for plasticizing and admixing the resins and a time on the order of about 7 minutes is satisfactory for the thorough mixing of the cadmium oxide into the plasticized resins.

When the mixture of the thermoplastic resins and the cadmium oxide is removed from the mill 1, it is fed into a sheeting device 5 which is shown as a pair of calendering rolls 6 and 7 which may be operated at a temperature of about 230° F. The calendering rolls 6 and 7 may be set to produce a sheet of any desired thickness. In this respect, it has been found practical to produce sheets as thin as 1 or 2 mils. The temperature set for the above has been found particularly satisfactory for the specific types of resin described, however, it should be understood that with other types of thermoplastic resins, the plasticizing temperatures will be selected by reference to tables of their physical properties.

If desired, the process from the calendering rolls may be continuous as shown in the drawing or the sheet material produced may be wound upon itself or upon a mandrel and stored preparatory to the next operation. The sheet material produced by the calendering operation is next pressed into a battery grid which, for the production of cadmium electrodes, is preferably an expanded nickel sheet or a nickel screen. For the pressing operation, the grid material from a supply roll 8 and the sheet material from the calender 5 are passed between two pressing rolls 9 and 11, operated at a temperature of from about 250° F. to about 300° F. to soften the thermoplastic binders. A pressure on the order of 2000 lbs. per square inch will be adequate for this purpose. While this process has been illustrated in connection with an operation wherein a single sheet of electrode material and a single grid have been utilized, it should be understood that two sheets of electrode material may be pressed into opposite sides of a grid with the surfaces of the two sheets bonding together within the interstices of the grid. In addition, a single sheet of electrode material may be utilized in combination with two grids or three sheets of electrode material may be utilized in combination with two or more grids and so on. The surfaces of the pressing rolls 9 and 11 may be coated with a material, such as cellophane, to which the thermoplastic materials will not adhere. It should be noted, that as illustrated, a portion of the grid has been left free of electrode active material. As will be explained in more detail later, this permits the utilization of that portion of the grid as the electrode lug.

Following the pressing operation, the soluble thermoplastic resin may be leached from the pressed assembly by passing it through a bath of the particular solvent in which the temporary thermoplastic resin is soluble and the permanent thermoplastic resin is insoluble. In this respect, it is also desirable that the electrode active material does not react adversely with the solvent. When polyethylene oxide is utilized as the temporary binder, water may be utilized as the solvent. As shown, the leaching operation may be accomplished in the tank 12 in which the stripped material is passed over a series of rollers 13 which serve to keep the material in this solvent for a time sufficient to permit the removal of the temporary binder. A bath in water for a period of time from about ½ hour to about 4 hours has been found sufficient for the complete removal of polyethylene oxide from the assembly. When placed in water, polyethylene oxide resin particles pass into the solution as long polymer chains which exude readily from the sheet material, leaving the electrode active material bound in a porous matrix of the insoluble resin. It should be noted that substantially no active material is lost from the matrix when the polyethylene oxide is leached from the resin bound matrix.

From the electrode assembly thus produced, battery electrodes 14 may be cut by means of pattern forming or blanking dies 15 to produce electrodes of any desired shape. As shown, the blanking dies may be so shaped as to remove from the electrode all but a small portion of the uncovered grid material, the remaining portion serving as the electrode lug. Following the cutting operation, the electrode 14 is ready for initial formation.

By way of example of the performance of a cadmium electrode produced in accordance with the process described above, a single sheet of resin bound material was pressed into an expanded nickel grid and cut to form an electrode 1¾ inches by 2½ inches in size. The original thickness of this electrode was 23 mils but after leaching and formation, the electrode swelled to a thickness of 40 mils. The grid utilized in this electrode weighed approximately 1 gram and the total electrode weight was 3.8 grams. The electrode was formed in a 31% solution of potassium hydroxide against a dummy nickel electrode for 4 hours. Following formation, the electrode was cycled three times to develop full capacity. When discharged at a ½ ampere rate, it yielded 0.28 ampere hour per gram of cadmium oxide present. When discharged at a 4 ampere rate, the electrode yielded 0.24 ampere hour per gram of cadmium oxide. The performance of this electrode compares extremely well with the performance of the conventional sintered plaque type electrode which have efficiencies within the range of about 0.25 to 0.30 ampere hour per gram of cadmium oxide. It should be noted, however, that the weight of the electrode of the present invention is approximately ⅔ the weight of such conventional cadmium electrodes.

While the proportions described above are considered for most applications to be those which give optimum performance, it should be understood that they may be varied and still produce electrodes having desirable characteristics. For example, the amount of cadmium oxide present in the electrode may be varied with respect to the amount of binder present. It has been found practical to load the plasticized resin binders with as much as 10 parts by weight of cadmium oxide to one part of the resin binders, soluble and insoluble, and practical electrodes have been produced with loadings as low as 2.5 parts by weight of cadmium oxide to one part by weight of resin binders. The electrode porosity may also be controlled by varying the proportion of soluble binder present with respect to the insoluble binder.

Example 2

To produce a silver electrode in accordance with the teachings of the present invention, there is intimately mixed under heat and pressure in an intensive mixer, one part by weight of polyethylene and one part by weight of water soluble polyethylene oxide to produce a plasticized mass. Into this plasticized mass, there is intimately mixed 22 parts by weight of finely divided silver powder. After a time interval adequate for the thorough and intimate mixing of the silver powder into the resins, the plasticized mass is removed from the mixer and calendered to sheets of suitable thickness. The calendered sheets thus produced are then pressed into a suitable grid and the soluble resin leached therefrom by means of a water bath. Following the leaching, the electrode of any size or shape can be cut from the assembly thus produced.

By way of example of the performance of a silver electrode made in accordance with the process described above, a wafer of active material was stamped from a calendered sheet and pressed into an expanded metal silver grid. This wafer was 1⅝ inches in diameter, 0.028 inch thick and contained 4.6 grams of silver. After the leaching of the water soluble resins, the electrode thus made was formed in a 30% solution of potassium hydroxide against suitable negative electrodes. After an overnight charge at 0.1 ampere, the electrode was discharged opposite zinc electrodes with excess capacity in the same 30% potassium hydroxide electrolyte. No separation was used and the three plate assembly was constructed with plates spaced about one inch apart. The discharge was made at 0.25 ampere per square inch and lasted 66 minutes, yielding an average cell voltage of 1.42 volts. The efficiency of this electrode, based on silver oxide (AgO), was approximately 90%. The performance of this electrode is comparable with that of a sintered silver electrode.

Though the proportions noted above for the silver electrode are generally preferred, they are not considered as critical limitations. For example, it has been found that the ratio of soluble resin to insoluble resin can be varied to change the porosity of the finished electrode. With respect to the loading of the resin binder with powdered silver, it has been found that the proportions given represent approximately the maximum amount of loading which can be achieved.

Example 3

In the production of silver electrodes in accordance with the present invention utilizing silver oxide (AgO) as the starting material and polyethylene oxide as the soluble temporary binder, loadings of over 7 parts by weight of silver oxide to one part by weight of the plasticized resins have been found to cause combustion of the mixture on the mill. The violent exothermic reaction produced is apparently triggered by the heat generated as a result of the friction which accompanies the working of the mixture on the mill at the plasticization temperature of the resins. Higher loadings can be achieved when the thermoplastic resin utilized as the temporary binder and pore forming agent has a higher molecular weight and is less subject to degrading than polyethylene oxide. It should be noted, however, that highly useful electrodes can be produced from formulations providing for loadings below the critical limits stated above.

Example 4

The present invention is applicable to production of many other types of electrodes. For example, it is applicable for the production of both the positive and the negative electrodes for lead-acid type batteries. To produce a lead positive electrode, finely powdered red lead oxide, such as #95 red lead, available commercially from the National Lead Co., is utilized as the active material. A typical formulation for a lead positive electrode is as follows: 1 part by weight of polyethylene, 2 parts by weight of polyethylene oxide and 37 parts by weight of lead oxide. It should be understood, however, that the above proportions can be varied with the maximum amount of loading of the plasticized resins with active material being 14 parts by weight per 1 part of the plasticized resins. The porosity of the electrodes thus produced may also be controlled by varying the ratio of the soluble resin to the insoluble resin. Positive lead electrodes produced in accordance with the present invention can be formed at higher rates than conventional lead positive electrodes because sulphates and litharge do not have to be mixed with the active material.

Example 5

A typical formulation for a lead negative electrode in accordance with the present invention is one part by weight of polyethylene, 2 parts by weight of polyethylene oxide and 37 parts by weight of sublime litharge, which is an extremely fine form of lead oxide (PbO). If desired, a small amount of powdered mercuric oxide may be added to this mix to reduce local action as will cobalt and other functional additives. For the lead negative electrodes, it has been found that a maximum loading of the binder with active material is approximately 14 parts by weight of litharge per one part by weight of the plasticized resins. An expanded sheet of lead antimony alloy or a lead screen has been found to make a satisfactory grid for both the positive and negative electrodes just described. In this respect, it should be noted that lead electrodes can be manufactured in accordance with the present invention which are much thinner than electrodes employing cast lead grids. In addition, it will be obvious to those skilled in the art that the teachings of the present invention are particularly adapted to the production of lead electrodes because they are more economic and efficient than conventional methods of lead electrode manufacture.

Example 6

Some examples of other electrodes which can be made in accordance with the teachings of the present invention are: zinc electrodes, tin electrodes and antimony electrodes, to mention but a few. A typical formulation for a zinc electrode comprises one part by weight of polyethylene, 3 parts by weight of polyethylene oxide, 2.8 parts by weight of mercuric oxide, and 37 parts by weight of finely powdered zinc oxide. The mercuric oxide is not an essential ingredient of the formulation, however, it has been found desirable to have mercuric oxide present in zinc electrodes to reduce local action. In this respect, it should be noted that as a result of the intimate mixing of the ingredients, the mercuric oxide is homogeneously dispersed throughout the electrode which adds to its effectiveness in reducing local action. It has been found that 10 parts by weight of zinc oxide to one part by weight of the plasticized resins is approximately the maximum amount of loading which can be achieved. As in the case with other electrodes described, the porosity of zinc electrodes also can be controlled by varying the ratio of the soluble resin to the insoluble resin.

Example 7

Tin electrodes have been produced utilizing the following proportions: 1 part by weight of polyethylene, ⅓ part by weight of polyethylene oxide and 14 parts of stannic oxide.

Example 8

Antimony electrodes have been produced utilizing the following proportions: 1 part by weight of polyethylene, one part by weight of polyethylene oxide and 20 parts by weight of antimony trioxide.

Example 9

To produce nickel electrodes in accordance with the teachings of the present invention there is intimately mixed under heat and pressure in an intensive mixer one part by weight of polyethylene and 1.7 parts by weight of polyethylene oxide to produce a plasticized mass. Into this plasticized mass there is intimately mixed 1.38 parts by weight of green nickel hydrate and 3.2 parts by weight of powdered graphite. Preferably the graphite and nickel hydrate are first mixed in a ball mill to effectively coat the nickel hydrate particles with graphite. A time interval on the order of about 5 to 15 hours has been found satisfactory for this purpose. After a time interval adequate for the thorough and intimate mixing of the nickel hydrate and graphite into the plasticized resins, the plasticized mass is removed from the mixer and calendered to produce sheets of suitable thickness. The calendered sheets thus produced are then pressed into a suitable grid and the soluble resin leached therefrom by means of a water bath. Following the leaching, electrodes of any size or shape may be cut from the assembly thus produced.

By way of example of the performance of a nickel electrode produced in accordance with the process described above, wherein the graphite was premixed with the nickel hydroxide by ball milling, two sheets of the resin bound material, each 9 mils thick, were pressed into an expanded nickel screen to produce an assembly 21 mils thick. From this assembly, electrodes 1¾ inches by 2¼ inches were cut. Following the cutting operation, the soluble resin phase was leached from the electrode in a water bath and the electrode swelled to a thickness of 26 mils. Total plate weight less grid was 3 grams. The electrode was charged in a 31% solution of potassium hydroxide against suitable cadmium electrodes and discharged to 0.6 volt at a rate of ¼ ampere per square inch, yielding an efficiency of 0.22 ampere hours per gram of nickel hydroxide present. This equals 76% of the theoretical capacity of the active material present. When the electrode was discharged at a rate of 1/16 ampere per square inch to the same voltage, the electrode efficiency was 86% of theoretical capacity. In considering this performance in comparison to that of a conventional sintered nickel plaque impregnated with nickel active material, it should be understood that the electrode described above has only ⅔ the weight of a conventional sintered electrode. Still further, the electrode of the present invention can be manufactured at a cost of one-half that of such a conventional electrode.

It should be understood that the proportions noted above are purely illustrative of a specific formulation which has been produced and successfully tested and that they may be varied to produce electrodes having different characteristics. For example, it has been practical to load the plasticized resins, both soluble and insoluble, with as high as 8 parts by weight of nickel and graphite to one part by weight of the resin binders. In addition, the percentage of graphite with respect to the active material may also be varied within the ranges of 1 to 6 parts of graphite to 13 parts of the nickel active material. With respect to the addition of grapihte to the active material, it has been found that the precoating of the active material particles with the graphite substantially increases electrode performance. However, it has also been found that when the graphite and active material are ball milled for a period of time greater than the 15 hours specified hereinbefore, the graphite will so thoroughly coat the active material particles that the availability of the active material to electrolyte is substantially decreased with a resulting loss in electrode efficiency. The optimum condition of coating is one which produces a porous, electrolyte permeable coating of graphite on each active material particle. Still further, it has been found that this optimum condition is best achieved when a mixture of powdered graphites having different particle sizes is utilized, that is, part coarse and part fine.

*Example 10*

To produce a mercury electrode in accordance with the teachings of the present invention, there is intimately mixed under heat and pressure in an intensive mixer one part by weight of polyethylene and one part by weight of water soluble polyethylene oxide to produce a plasticized mass. Into this plasticized mass there is intimately mixed 20 parts by weight of yellow mercuric oxide and 2.4 parts by weight of finely divided graphite. As was the case with the nickel electrode described hereinbefore, superior electrode performance is achieved with the graphite and mercuric oxide when they are intimately mixed to coat the mercuric oxide particles with the graphite prior to the blending into the plasticized resins. After a time interval adequate for the thorough and intimate mixing of the mercuric oxide and graphite into the resins, the plasticized mass is removed from the mixer and calendered into sheets of suitable thickness. The calendered sheets thus produced are pressed into a suitable grid and the soluble resin leached therefrom by means of a water bath. Following the leaching, an electrode of any size or shape can be cut from the assembly thus produced.

In order to illustrate the advantage of premixing the graphite and active material so as to produce a porous coating of graphite on the individual active material particles, but not to so thoroughly coat the particles that they are no longer available to take part in the electrochemical reaction of a cell, three cells A, B, and C were constructed utilizing the formulation given above for a mercury electrode. In cell A, the graphite and the mercuric oxide were not premixed. In cell B, the graphite and mercuric oxide were premixed in a ball mill, for a period of 15 hours. In cell C, the graphite and mercuric oxide were premixed in a ball mill for a period of 90 hours. Each of the cells had 8 formed cadmium electrodes and 7 positive mercury electrodes. The electrodes were each 2 3/16 inches by 1 3/16 inches in size. The positive electrodes each comprised two pieces of the resin bound mercuric oxide and graphite formulation described above pressed into opposite sides of a sheet of expanded nickel. A sleeve of regenerated cellulose was placed around each electrode to provide separation. A 34% solution of potassium hydroxide was utilized as the cell electrolyte and the cells were sealed. Each of the cells so constructed had an open circuit cell voltage of 0.91 volt. Cell A was discharged for 25½ hours at a 0.22 ampere rate with an average plateau voltage of 0.8 volt. Under the same conditions, cell B provided an extra hour of useable power. Cell C, however, the cell in which the graphite and active material was premixed for a period of 90 hours, when discharged at the same rate, could be discharged for only 18 hours with a plateau voltage of 0.53 volt. From this, it can be seen that as a result of the prolonged mixing of the active material and graphite, much of the active material within the cell was made unavailable to the electrolyte and hence, was not available to take place in the electrochemical reaction of the cell. When the cells were recharged, at an 0.1 ampere hour rate, cell A accepted only one ampere hour of charge. Cell B, however, accepted 3.11 ampere hours of charge at the same rate. Cell C could not be recharged. On discharge, Cell A had 1.05 ampere hours capacity at an average voltage of 0.7 volt. Cell B, the cell in which the graphite and mercuric oxide were premixed for 15 hours, had 2.79 ampere hours of capacity at an average cell voltage of 0.7 volt.

From the results of the tests described above, it can be seen that the premixing for a period of 15 hours, provided a mercury cell which could be recharged to better than 50% of its original capacity which was almost 2½ times the performance obtained without the premixing. These tests also demonstrated that premixing for too long a period made much of the active material unavailable for an electrochemical discharge. It should be understood, however, that the formulation given hereinbefore is not necessarily that which will give optimum performance. While it is felt that for most active materials a 15 hour premixing will be sufficient to assure good electrical contact between the active material particles without a loss of efficiency due to the complete coating of the particles, it should be understood that this will vary depending on the physical natures of particular active materials and those of the graphite particles used.

*Example 11*

The present invention is applicable to the production of many other types of electrodes. For example, copper electrodes have been made utilizing the following formulation: 1 part by weight of polyethylene, 1 part by weight of water soluble polyethylene oxide, 10 parts by weight of cupric oxide and 0.68 part by weight of finely divided graphite.

*Example 12*

Similarly, manganese electrodes have been made utilizing the teachings of the present invention. A typical formulation for a manganese electrode is 1 part by weight of polyethylene, 1 part by weight of water soluble polyethylene oxide, 10 parts by weight of electrolytic manganese dioxide and 1.7 parts by weight of finely divided graphite.

It should be noted that while typical formulations have been given for twelve active materials, that the teachings of the present invention are applicable to the manufacture of most types of electrodes in which the active material is in a powdered or finely divided form. In addition, certain modifications may be made in the teachings of the present invention without parting from the essence of the invention. For example, in carrying out the present invention, electrodes may be cut from the pressed electrode assembly prior to the leaching operation. It should be noted, however, that this will necessitate the handling of individual electrodes during the leaching step of the process. While the cutting operation may precede the leaching operation, it has been found that it is not desirable to leach the temporary soluble resin binder from the sheet material prior to the pressing of that material into a battery grid since the pressing operation will of necessity cause the electrode to lose some of the porosity achieved by the removal of the soluble resin phase by collapse of the microporous structure initially derived from capillary expansion. In addition, where the sheet material is exceptionally thin and the permanent resin binder represents but a small portion of the total binder present in the sheet material, it has been found that the presence of a grid makes it possible to remove the soluble resin phase without loss of structurization.

While the electrodes of the present invention have been illustrated as having electrode grids, it should be understood that for certain applications, the material produced by the calendering operation may be used in a battery without a grid after the removal of the soluble resin phase. This will be particularly true in the case of electrodes for primary battery applications. In addition, it should be further understood that while for some applications, it is desirable to calender the material to produce thin sheets, that for other applications, other means of electrode shaping, such as an extrusion process, may be desirable and should be considered within the scope of the present invention.

Since electrode performance is governed by the amount of active material available to enter into the electrochemical reaction, it is desirable to provide as much active material in an electrode as possible within the limits of the size and weight limitations, electrode design specifications and efficient utilization of that active material. In addition, for efficient utilization of the electrode material and good electrical conductivity, sufficient electrode material must be incorporated in the binder so that it is present in a substantially continuous phase. Since binding materials are inert and contribute nothing to the electrochemical reaction of a battery, it is desirable that electrodes utilize as little binding material as possible in proportion to active material commensurate with providing reasonable mechanical strength.

The amount of active material with which a given thermoplastic binder can be loaded depends primarily upon the size of the active material particles. As a general rule, it has been found that the amount of loading which can be achieved will increase as the size of the active material particles increase. In this respect, however, it should be noted that for battery electrode applications, increased loading does not necessarily increase electrode performance since electrode performance is governed by the availability of the active material to take part in the electrochemical reaction of the battery and for this purpose, it is desirable to have the active material particle size as fine as possible. In the foregoing discussion, the limit as to what constitutes maximum loading of the binder has been governed by practical manufacturing considerations. Foremost among such considerations is the ability of the loaded resins in their plasticized state to be retained on the mill during mixing. Electrode handleability during manufacture and the strength of the finished electrodes are further considerations.

In the electrodes of the present invention, electrode porosity is in part dependent upon the ratio of the soluble thermoplastic resin binder to the insoluble thermoplastic resin binder, and to a larger degree, upon the derivation of interstitial voids by virtue of the operation of capillary expansion. Accordingly, the manufacturing methods of the present invention provide a new and improved method of controlling final electrode porosity. In this respect, an extremely high electrode porosity does not necessarily provide good electrode performance. Optimum electrode porosity is that which will provide the largest interface between the electrolyte and the active material while maintaining continuity of the electrolyte with the opposing electrode pole and the active material in electrical contact with the electrode grid either through direct contact or by continuity of contact through adjacent particles of active material. It has been found that optimum electrode porosity is achieved in the electrodes of the present invention where the soluble thermoplastic resin is present in amounts varying from approximately ⅓ the amount of the insoluble resin to three times the amount of the insoluble resin. In the specific electrode formulations cited hereinbefore, the ratio of these resins specified unless stated to provide optimum porosity do not necessarily represent the optimum ratio. It should also be understood that electrode porosity is also dictated by the purpose for which the electrode is intended and also the physical strength required for the electrode.

With respect to the addition of graphite to the active materials, it has been found that best results have been obtained when the graphite is added to the active materials in amounts ranging from about 0.075 to 0.5 part by weight of graphite to one part by weight of active material. As shown hereinbefore, it has also been found that the premixing of the graphite and the active material produces superior electrode performance. It should be noted, however, that when premixing is employed, care should be taken so as not to provide an electrolyte impermeable coating of graphite on the active material particles. To this end, it has also been found helpful to utilize finely divided graphite having varying particle sizes.

Having described the invention, that which is claimed as new is:

1. An electrode material comprising a battery active material in powdered form homogeneously dispersed in a continuous phase throughout and bound in a binder comprising a first thermoplastic resin homogeneously and intimately mixed with a second thermoplastic resin, said second thermoplastic resin being present in a ratio based upon parts by weight of said first thermoplastic resin of between 1 to 3 and 3 to 1, said second thermoplastic resin being substantially insoluble in said first thermoplastic resin and soluble in a solvent in which said first thermoplastic resin and said battery active material are substantially insoluble and inert.

2. An electrode material as specified in claim 1 wherein said battery active material is intimately mixed with graphite.

3. An electrode material as specified in claim 2 wherein said graphite is present in an amount of from about 0.75 to about 0.5 part by weight of said active material.

4. An electrode material as specified in claim 2 wherein said battery active material is selected from the group consisting of nickel hydroxide, mercuric oxide, cupric oxide, and manganese dioxide.

5. An electrode material as specified in claim 1 wherein said first thermoplastic resin is selected from the group consisting of polyethylene, polypropylene, polystyrene, and polyvinyl chloride.

6. An electrode material as specified in claim 1 wherein said second thermoplastic resin is selected from the group consisting of polyethylene oxide, polyethylene glycol, and polyvinyl pyrolidone.

7. An electrode material as specified in claim 1 wherein said active material is selected from the group consisting of cadmium oxide, silver, silver oxide, lead oxides, zinc oxide, stannic oxide, and antimony trioxide.

8. A method of producing electrodes which comprises intimately and homogeneously mixing a plasticized first thermoplastic resin, a plasticized second thermoplastic resin in a ratio based upon parts by weight of said first thermoplastic resin of between 1 to 3 and 3 to 1 and a battery active material in powdered form to produce a plasticized mass in which said battery active material is dispersed in a continuous phase, said second thermoplastic resin being substantially insoluble in said first thermoplastic resin, shaping said mass to produce an electrode, and subjecting said electrode to a solvent in which said first thermoplastic resin and said battery active material are substantially insoluble and inert and said second thermoplastic resin is soluble to substantially remove said second thermoplastic resin from said electrode to leave said electrode porous.

9. An electrode for batteries according to the method of claim 8.

10. Method of claim 8 wherein graphite is added to said plasticized mass.

11. Method of claim 8 wherein said graphite is added in an amount from about 0.075 to about 0.5 part by weight of said battery active material.

12. Method of claim 11 including the step of pre-mixing said graphite and said battery active material prior to the mixing with said thermoplastic resins.

13. Method of claim 11 wherein said battery active material is selected from the group consisting of nickel hydroxide, mercuric oxide, cupric oxide, and manganese dioxide.

14. Method of claim 8 wherein said first thermoplastic resin is selected from the group consisting of polyethylene, polypropylene, polystyrene, and polyvinyl chloride.

15. Method of claim 8 wherein said second thermoplastic resin is selected from the group consisting of polyethylene oxide, polyethylene glycol, and polyvinyl pyrilidone.

16. Method of claim 8 wherein said active material is selected from the group consisting of cadmium oxide, silver, silver oxide, lead oxides, zinc oxide, stannic oxide, and antimony trioxide.

17. A method of producing electrodes which comprises intimately and homogeneously mixing under heat and pressure a first thermoplastic resin, a second thermoplastic resin in a ratio based upon parts by weight of said first thermoplastic resin of between 1 to 3 and 3 to 1 and a battery active material in powdered form to produce a plasticized mass in which said battery active material is dispersed in a continuous phase, said mixing being carried out at a temperature sufficient to plasticize both resins and insufficient to substantially degrade said resins and said battery active material, said second thermoplastic resin being substantially insoluble in said first thermoplastic resin, shaping said mass to produce an electrode, and subjecting said electrode to a solvent in which said first thermoplastic resin and said battery active material are substantially insoluble and inert and said second thermoplastic resin is soluble to substantially remove said second thermoplastic resin from said electrode to leave said electrode porous.

18. An electrode for batteries according to the method of claim 17.

19. Method of claim 17 wherein graphite is added to said plasticized mass.

20. Method of claim 17 wherein said graphite is added in an amount from about 0.075 to about 0.5 part by weight of said battery active material.

21. Method of claim 20 including the step of pre-mixing said graphite and said battery active material prior to the mixing with said thermoplastic resins.

22. Method of claim 20 wherein said battery active material is selected from the group consisting of nickel hydroxide, mercuric oxide, cupric oxide, and manganese dioxide.

23. Method of claim 17 wherein said first thermoplastic resin is selected from the group consisting of polyethylene, polypropylene, polystyrene, and polyvinyl chloride.

24. Method of claim 17 wherein said second thermoplastic resin is selected from the group consisting of polyethylene oxide, polyethylene glycol, and polyvinyl pyrilidone.

25. Method of claim 17 wherein said active material is selected from the group consisting of cadmium oxide, silver, silver oxide, lead oxides, zinc oxide, stannic oxide, and antimony trioxide.

26. A method of producing electrodes which comprises intimately and homogeneously mixing under heat and pressure a first thermoplastic resin, a second thermoplastic resin in a ratio based upon parts by weight of said first thermoplastic resin of between 1 to 3 and 3 to 1 and a battery active material in powdered form to produce a plasticized mass in which said battery active material is dispersed in a continuous phase, said mixing being carried out at a temperature sufficient to plasticize both resins and insufficient to substantially degrade said resins and said battery active material, said second thermoplastic resin being substantially insoluble in said first thermoplastic resin, sheeting said mass, pressing together said sheet and a metal grid, subjecting the assembly thus produced to a solvent in which said first thermoplastic resin, said battery active material, and said grid are substantially insoluble and inert and said second thermoplastic resin is soluble to substantially remove said second thermoplastic resin from said assembly to leave it porous, and cutting from said assembly a battery electrode.

27. An electrode for batteries according to the method of claim 26.

28. Method of claim 26 wherein graphite is added to said plasticized mass.

29. Method of claim 26 wherein said graphite is added in an amount from about 0.075 to about 0.5 part by weight of said battery active material.

30. Method of claim 29 including the step of premixing said graphite and said battery active material prior to the mixing with said thermoplastic resins.

31. Method of claim 29 wherein said battery active material is selected from the group consisting of nickel hydroxide, mercuric oxide, cupric oxide, and manganese dioxide.

32. Method of claim 26 wherein said first thermoplastic resin is selected from the group consisting of polyethylene, polypropylene, polystyrene, and polyvinyl chloride.

33. Method of claim 26 wherein said second thermoplastic resin is selected from the group consisting of polyethylene oxide, polyethylene glycol, and polyvinyl pyrilidone.

34. Method of claim 26 wherein said active material is selected from the group consisting of cadmium oxide, silver, silver oxide, lead oxides, zinc oxide, stannic oxide, and antimony trioxide.

35. A method of producing electrodes which comprises intimately and homogeneously mixing under heat and pressure one part by weight of polyethylene, polyethylene oxide in a ratio based upon parts by weight of said polyethylene of between 1 to 3 and 3 to 1 and a battery active material in powdered form to produce a plasticized mass in which said battery active material is dispersed in a continuous phase, said mixing being carried out at a temperature sufficient to plasticize said polyethylene and said polyethylene oxide and insufficient to substantially degrade said polyethylene, said polyethylene oxide and said battery active material, sheeting said mass, pressing together said sheet and a metal grid, subjecting the assembly thus produced to a water bath to substantially remove said polyethylene oxide from said assembly to leave it porous, and cutting from said assembly a battery electrode.

36. An electrode for batteries according to the method of claim 35.

37. Method of claim 35 wherein graphite is added to said plasticized mass.

38. Method of claim 35 wherein said graphite is added in an amount from about 0.075 to about 0.5 part by weight of said battery active material.

39. Method of claim 38 including the step of premixing said graphite and said battery active material prior to the mixing with said polyethylene and said polyethylene oxide.

40. Method of claim 38 wherein said battery active material is selected from the group consisting of nickel hydroxide, mercuric oxide, cupric oxide, and manganese dioxide.

41. Method of claim 35 wherein said active material is selected from the group consisting of cadmium oxide, silver, silver oxide, lead oxides, zinc oxide, stannic oxide, and antimony trioxide.

References Cited in the file of this patent

UNITED STATES PATENTS

| | | |
|---|---|---|
| 393,955 | Woodward | Dec. 4, 1888 |
| 587,829 | Hulin | Aug. 10, 1897 |
| 2,708,683 | Eisen | May 17, 1955 |
| 2,737,541 | Coolidge | Mar. 6, 1956 |
| 2,738,375 | Schlotter | Mar. 13, 1956 |
| 2,811,572 | Fischbach | Oct. 29, 1957 |
| 2,819,962 | Salauze | Jan. 14, 1958 |
| 2,894,052 | Evans | July 7, 1959 |
| 2,902,530 | Eisen | Sept. 1, 1959 |

FOREIGN PATENTS

| | | |
|---|---|---|
| 270,763 | Great Britain | July 12, 1928 |